United States Patent
Barkis et al.

(10) Patent No.: US 6,897,170 B2
(45) Date of Patent: May 24, 2005

(54) TUFTABLE FABRIC WITH BALANCED CONSTRUCTION

(75) Inventors: Edward Barkis, Marietta, GA (US); Charles F. Phillips, Nashville, GA (US)

(73) Assignee: Propex Fabrics, Inc., Austell, GA (US)

( * ) Notice: Subject to any disclaimer, the term of this patent is extended or adjusted under 35 U.S.C. 154(b) by 0 days.

(21) Appl. No.: 10/268,837

(22) Filed: Oct. 10, 2002

(65) Prior Publication Data

US 2003/0031825 A1 Feb. 13, 2003

Related U.S. Application Data

(63) Continuation of application No. 09/457,166, filed on Dec. 8, 1999, now abandoned.
(60) Provisional application No. 60/111,855, filed on Dec. 11, 1998.

(51) Int. Cl.$^7$ .................... D03D 15/00; B32B 5/08; B32B 33/00
(52) U.S. Cl. .................... 442/195; 442/189; 442/192; 442/199; 442/209; 442/213; 442/217; 442/218; 428/95; 428/96; 139/420 R
(58) Field of Search ................... 442/189, 195, 442/209, 213, 217, 218, 185, 186, 192, 199, 200; 428/95, 97, 373; 139/420 R

(56) References Cited

U.S. PATENT DOCUMENTS 3,439,865 A * 4/1969 Port et al. ............... 139/420 R
3,627,605 A * 12/1971 Taylor ........................ 156/148
5,966,797 A * 10/1999 Okazaki et al. ............ 29/527.2

\* cited by examiner

Primary Examiner—Cheryl A. Juska
Assistant Examiner—Jenna-Leigh Befumo
(74) Attorney, Agent, or Firm—King & Spalding LLP

(57) ABSTRACT

Tuftable fabrics comprise a plurality of warp and weft tapes in a balanced construction of tapes with balanced dimensions of tapes in the warp and the weft and stabilization of the fabric to impart dimensional stability. The fabrics are useful as backings for tufted carpets and especially patterned carpets and carpet tile owing to a surprising combination of tuftability, resistance to edge curl and stability during tufting.

18 Claims, No Drawings

TUFTABLE FABRIC WITH BALANCED CONSTRUCTION

This application is a continuation of U.S. application Ser. No. 09/457,166, filed Dec. 8, 1999, now abandoned, which claims the benefit of U.S. Provisional Application No. 60/111,855 filed Dec. 11, 1998.

FIELD OF THE INVENTION

This invention relates to fabrics suitable for tufting and more particularly tuftable carpet backing fabrics constructed from tapes and carpets comprising such backing fabrics.

BACKGROUND OF THE INVENTION

Most backings for carpets are fabrics woven from synthetic yarns. While any number of fabric constructions, yarn configurations and compositions has been utilized or proposed, woven polypropylene tapes, including extruded tapes and slit film, are preferred due to a desirable combination of properties, including tuftability, strength, mold resistance and cost. For some carpets, however, conventional backing fabrics are deficient in one or more respects.

For example, patterned carpets have generally been unavailable or limited to large or irregular patterns due to inadequate dimensional stability of woven tape backings. Shifting and irregular movement of the backings as they advance through a tufting machine result in unacceptable distortion and pattern nonuniformity. Dimensional stabilities of conventional backings typically are 10 lbs. or less and are inadequate for fine patterned carpets. Fabric constructions with many tapes per unit length in the warp and the weft, inclusion of special yarns, and application of coatings or heat sealing to lock the tapes in place have been proposed to increase dimensional stability but they lead to other difficulties. High tape count constructions, e.g., 24×15, 22×24 and 28×15 warp count by weft count, are known and have improved dimensional stability due to greater numbers of tape crossovers per unit area than in lower count fabrics. However, weaving such fabrics is complicated and more costly due to the larger numbers of narrower tapes. In any event, dimensional stabilities of the fabrics do not generally exceed about 30 lbs., whereas stabilities of 50 lbs. or greater would be desirable to promote uniformity in patterned tufting. Coating and heat sealing result in fabrics that are more costly, stiff and difficult to handle. In addition, improvements in dimensional stability resulting from coatings and heat sealing tend to be attained at the expense of tuftability because tufting needles and face yarns are prevented from penetrating the fabrics at the interstices formed by yarn crossovers and, instead, must penetrate through the plastic of the coating and/or the tapes. In high speed tufting, friction between needles and coated or sealed backings can result in heat sufficient to damage face yarns. Use of special yarns may require separate beaming and tension control during weaving, create irregularities in the weave, impede tufting and limit or complicate recycle of fabrics.

As another example, in manufacture of carpet tiles, tufted backing fabrics typically are affixed to a substrate, such as a rubber or vinyl-glass fiber composite substrate. Heating to dry and cure the substrates can involve exposures of the tufted backings to temperatures as high as 300–350° F. for times as long as three to four minutes. As a result of these heat exposures, curling of the tufted backing fabrics can occur. While curling up to about 0.5 to 1 mm is considered tolerable, conventional woven polypropylene backings often curl as much as five to ten mm. Nonwoven polyester fabrics are often used as backings for carpet tiles because polyester softens at temperatures above polypropylene and thus can better withstand heat exposures in tile manufacture. However, polyester backings are more expensive and non-wovens as a rule have dimensional stabilities considerably lower than woven fabrics. Backings woven from tapes composed of polyester or blends thereof with minor amounts of polyolefins such as polypropylene are also known and withstand higher temperatures than woven polypropylene tapes; however, the backings are more costly, polyester tapes are more brittle and backings woven therefrom do not tuft as well as woven polypropylene tape backings.

There is, accordingly, a need for tuftable fabrics having an improved combination of tuftability, dimensional stability and resistance to curling.

SUMMARY OF THE INVENTION

This invention solves problems such as described above and provides improved fabrics suitable for tufting and carpets containing the same as backings.

In one embodiment, the invention provides fabrics suitable for tufting comprising a plurality of warp tapes and a plurality of weft tapes in a balanced construction having average numbers of warp tapes per unit length in balance with average numbers of weft tapes per unit length and average width, thickness and denier of the warp tapes in balance with average width, thickness and denier of the weft tapes and wherein the fabric is stabilized such that a peak force of at least about 50 pounds is required to remove from the fabric ten adjacent parallel yarns disposed perpendicular to the direction in which the force is applied.

In another embodiment, the invented fabrics are suitable for tufting and comprise a plurality of substantially parallel warp tapes and a plurality of substantially parallel weft tapes, wherein tapes are stabilized within the fabric such that a peak force of at least about 50 pounds is required to remove from the fabric ten adjacent parallel yarns disposed perpendicular to the direction in which the force is applied and wherein (a) the warp and weft tapes are present in the fabric in a balanced construction with average count of the warp tapes and average count of the weft tapes being the same or different by no more than about 15% and ranging from about 8 to about 14 tapes per inch, (b) average counts and widths of the warp tapes and of the weft tapes are such as to provide substantially full coverage without substantial overlap of warp tapes with other warp tapes or of weft tapes with other weft tapes, (c) average thicknesses of the warp and of the weft tapes are the same or different by no more than about 15%, and (d) average deniers of the warp tapes and of the weft tapes are the same or different by no more than about 15%.

In another embodiment, the invented fabrics are suitable for tufting and comprise a plurality of substantially parallel warp tapes of a thermoplastic resin composition comprising polypropylene and a plurality of substantially parallel weft tapes of a thermoplastic resin composition comprising polypropylene, wherein tapes are stabilized within the fabric by a layer of thermoplastic resin adhered to tapes at at least one surface of the fabric, the fabric has dimensional stability such that a peak force of at least about 50 pounds is required to remove from the fabric ten adjacent parallel yarns disposed perpendicular to the direction in which the force is applied and (a) the warp and weft tapes are present in the fabric in a balanced construction with average count of the warp tapes and average count of the weft tapes being the same or different by not more than about 15% and ranging from about 8 to about 14 tapes per inch, (b) average counts and widths of the warp tapes and of the weft tapes are such as to provide substantially full coverage without substantial overlap of warp tapes with other warp tapes or of weft tapes with other weft tapes, (c) average thicknesses of the warp and of the weft tapes are the same or different and range from about 1.8 to about 2.6 mils, and (d) average deniers of the warp tapes and of the weft tapes are the same or different and range from about 650 to about 1750, and (e) a product of average warp count multiplied by average denier of the warp tapes equals about 10,000 to about 13,000 and a product of average weft count multiplied by average denier of the weft tapes equals about 10,000 to about 13,000.

The invention also provides such fabrics in the form of carpets and other tufted products having a plurality of tufts of face yarn or fibers projecting outwardly from a surface of the fabric and a plurality of stitches of such face yarn or fibers disposed on another surface of such fabric and secured to the fabric. The fabrics in such form are particularly well suited as patterned carpets. The fabrics can also comprise a secondary backing fabric or other substrate secured to the stitched surface. The fabrics in this form with a substantially self-supporting, rigid or resilient sheet as a substrate are well suited as carpet tiles.

As used herein, the expression "average count" refers to average numbers of tapes per inch; average warp count is the average number of warp tapes per inch and average weft count is average number of weft tapes per inch. The term "mils" refers to a measurement of length equal to 0.001 inch. The "warp" direction of a fabric refers to the direction of advancement of the fabric through a loom or other equipment for manufacture thereof; "warp tapes" are tapes disposed such that their lengths extend in the warp direction of a fabric. The "weft" direction of a fabric refers to the direction transverse to the warp direction; weft tapes are tapes disposed such that their lengths extend in the weft direction of the fabric. Dimensional stabilities referred to herein are determined by the test procedure described in connection with the examples appearing below.

DETAILED DESCRIPTION OF THE INVENTION

In greater detail, the invented fabrics have a balanced construction of warp and weft tapes with the tapes configured both in relation to each other and to fabric construction to promote balanced properties in the warp and weft and are stabilized to provide improved dimensional stability. This combination of features provides surprising resistance to curling together with excellent tuftability and stability during tufting, thereby making the invented fabrics particularly suited as backings for carpets, rugs, carpet tiles and other floor coverings and tufted products.

Patterned carpets prepared by tufting the invented fabrics with face yarns show good pattern definition and regularity due to the improved stability and balance of the fabrics. Surprisingly, fine patterned carpets, and even those with regular patterns, show good pattern uniformity and regularity. As a result, intricate patterns, such as fine plaids and complex geometries, can be tufted with considerably better appearance and efficiency than with conventional backing fabrics. Accent yarns tufted into the invented backings also tend to have surprisingly improved visibility compared to those in conventional backings. To promote uniformity and regularity of patterns in patterned carpets, the invented fabrics preferably have dimensional stabilities such that peak force to remove ten adjacent parallel yarns perpendicular to the direction in which the force is applied is at least about 65 pounds.

For manufacture of carpet tiles, the invented fabrics withstand the heat exposures encountered in curing of substrates with considerably less curling than conventional backings. As a result, use of costly polyester backings can be avoided and waste resulting from curling of conventional woven tape backings is avoided. Preferred fabrics according to the invention withstand exposure to temperatures up to 300° F. for up to three minutes without substantial curling. More preferably, exposures to temperatures of about 300 to 350° F. for three minutes produce edge curling of no more than about 4 mm and most preferably no more than about 2 mm.

A further advantage of the invented fabrics is that thinner tapes and lower average tape counts than in conventional backings can be utilized in backing fabrics without loss of strength, integrity or other desirable backing properties.

The invented fabrics comprise a plurality of tapes extending in a warp direction of the fabric and a plurality of tapes extending in a weft direction. The warp tapes are disposed substantially in parallel to each other and, likewise, the weft tapes are disposed substantially in parallel to each other. Warp tapes are preferably, though not necessarily, disposed substantially perpendicular to weft tapes. The tapes are present in the fabrics in average numbers per unit length along each of the warp and weft directions of the fabric and so-dimensioned as to provide a balance in the construction thereof that is believed to contribute to the improved performance of the fabrics as backings for carpets. Balance in construction of the invented fabrics is achieved by constructing the fabrics with average warp counts and average weft counts that are balanced with respect to each other. Preferably, average warp count and average weft count differ by no more than about 15% and more preferably by not more than 10% to promote balance in fabric construction and properties.

The tapes from which the invented fabrics are constructed are essentially flat structures, with significantly greater average width than average thickness. Generally the ratio of average width to average thickness is at least about 15:1 and preferably from about 25:1 to about 200:1. Cross-sections of the tapes can be rectangular or contoured, for example, with striations or with grooves, ridges or other serrations. Contoured tapes are preferred, particularly for fabrics to be used as backings in high speed tufting operations, because the same are more easily penetrated by tufting needles and with less heat generation than flat tapes. Preferred contoured tapes have thinner and thicker areas extending along their lengths and alternating across their widths. A preferred form of contoured tape is a serrated tape of the type described in commonly assigned U.S. Pat. No. 5,925,434, which is incorporated herein by reference. The serrated tapes have a plurality of ridges or "mesas" and channels or grooves that preferably extend along the lengths of the tapes and alternate across their widths. In a preferred embodiment, distance from a midpoint of one ridge to a midpoint of an adjacent ridge is about 10 to about 20% of the width of the tape, the height of the ridges above the channels is about 40 to about 60% of the average thickness of the tape and the ridges have generally concave sides and a flat top having a width of about 20 to about 70% of the distance between adjacent ridges. While such tapes represent a preferred form of contoured tapes for the invented fabrics, serrated tapes with different patterns and dimensions, as well as other forms of contoured-tapes are contemplated.

The tapes can be composed of any thermoplastic resin composition capable of being formed into tape and stabilized within a fabric and tufted. Examples of resin compositions include polyolefins, such as polypropylene and propylene-ethylene copolymers, polyesters and nylons. Polyolefins are preferred due to their cost and performance characteristics. More preferably, the thermoplastic resin composition comprises a polypropylene homopolymer or copolymer resin, with homopolymer polypropylene being most preferred. The resin compositions can contain pigments, stabilizers, anti-microbial agents, fillers and other suitable additives. Such materials and their use are well known in the art.

The tapes can be prepared by any suitable method. Common methods include extrusion of thermoplastic resin compositions into tapes using suitably configured dies, and extrusion of such compositions in the form of film and slitting the same into tapes. In both, tapes usually are drawn to increase their tenacities. Tapes also are often annealed to reduce their tendency to shrink. Extrusion, slitting, drawing and annealing techniques are well known to persons skilled in the art of extruding thermoplastic tapes and films for manufacture of synthetic carpet backings.

The warp and weft tapes are present in the fabric in a balanced construction and with average widths, thicknesses and deniers of the warp tapes and the weft tapes being sufficiently close to also promote balance in the warp and weft of the fabric. Preferably, the tapes are composed of a thermoplastic resin composition comprising the same thermoplastic resin with average widths, average thicknesses and average deniers of the warp and weft tapes being the same or different by not more than about 15% and, more preferably, not more than about 10%. Most preferably, the average warp and weft counts differ by not more than about 5% to maximize constructional balance. Preferred balanced constructions have average warp counts and average weft counts that range from about 8 to about 14 tapes per inch. Balanced constructions having an average of about 10 to about 14 warp tapes per inch and an average of about 10 to about 14 weft tapes per inch are preferred over constructions with lower average counts because the fabrics have greater strength, integrity and stability during tufting.

Average counts of the warp tapes and weft tapes and average widths of the respective tapes are such that the tapes provide substantially full coverage without substantial overlap of the warp tapes with other warp tapes or of weft tapes with other weft tapes. As will be appreciated by persons skilled in the art, in practice, fabrics constructed to achieve substantially full coverage without substantial overlap may in fact have less than 100% coverage, for example due to twisting or folding of tapes during weaving or other aspects of manufacture. They may also have slight overlap of warp or weft tapes, again due to manufacturing factors. Indeed, within a given fabric, some areas may have less than full coverage while others may display overlap. Thus, as used herein, the expression "substantially full coverage without substantial overlap" is used in the context of the art of fabric manufacture and will be understood to refer to fabrics in which there is 100% coverage without overlap of tapes as well as those in which there is somewhat less than full coverage and in which there is some overlap of tapes in one or both of the warp and weft directions.

In keeping with these practical considerations, tape widths suitable for the invented fabrics of a given construction generally equal one inch divided by average count, plus or minus 5%. Accordingly, it will be appreciated that for balanced constructions with average warp and average weft counts of about 8 to about 14 tapes per inch, average widths of the warp and weft tapes will generally range from about 64 mils in the case of average counts of about 14 to about 132 mils in the case of average counts of about 8. Average width of the warp tapes can be the same as the average width of the weft tapes or the average widths of the tapes can be different. Preferably, average widths of the warp tapes and of the weft tapes are equal or different by not more than about 15%. Differences of not more than about 10% are more preferred to maximize balance in fabric properties.

For balanced constructions in which average warp and average weft counts are about 8 to about 14, average thicknesses of the warp tapes and weft tapes are the same or different by not more than about 15% and more preferably not more than 10%. In the case of tapes composed of a thermoplastic resin composition comprising polypropylene, preferred thicknesses range from about 1.8 to about 2.6 mils. Preferably, average thicknesses of the warp and weft tapes are the same or different and range from about 2 to about 2.4 mils. Most preferably, average thicknesses of the warp tapes and of the weft tapes are equal or different by no more than about 5% to ensure a high degree of balance.

Average deniers of the warp tapes and the weft tapes in fabrics with balanced constructions having average tape counts of about 8 to about 14 tapes per inch are the same or different by not more than about 15%. For tapes of a given composition, denier will vary with the product of width and thickness. In addition, in view of the previously described relationships between fabric constructions and average tape widths, average deniers of tapes of a given composition will vary with fabric constructions; fabrics having lower average tape counts will have higher average deniers than fabrics with higher average tape counts, other things being equal.

Preferred tapes composed of thermoplastic resin compositions comprising polypropylene have deniers of about 650 to about 1750 g/9000 m. For these fabrics the relationship between average tape deniers and fabric constructions is such that the product of average warp count multiplied by average denier of the warp tapes is about 10,500 to about 13,000 and the product of average weft count multiplied by average denier of the weft tapes is about 10,500 to about 13,000. Polypropylene tape fabrics with average counts and average tape deniers such that their product is less than about 10,500 have inadequate coverage or are too thin and flimsy for effective tufting. Fabrics in which average counts and average tape deniers yield a product greater than about 13,000 tend to have too much overlap of adjacent tapes or be too heavy or stiff. The product calculated with respect to the warp tapes can be the same as or different from the product calculated for the weft tapes. More preferably, for polypropylene tape fabrics, the product of average warp count multiplied by average warp tape denier is about 11,000 to about 12,500 and the product of average weft count multiplied by average weft tape denier is about 11,000 to about 12,500. Most preferably, products of average counts and average deniers in each direction are about 11,500 to about 12,000.

A particular construction according to the invention comprises a plurality of substantially parallel warp tapes of a thermoplastic resin composition present at an average count of about 8 tapes per inch and a plurality of substantially parallel weft tapes comprising the thermoplastic resin present at an average count of about 8 per inch. In such a construction, preferred tapes have average widths of about 110 to about 140 mils. Preferred polypropylene tapes for such a construction have average thicknesses of about 1.8 to about 2.6 mils and average deniers of about 1300 to about 1600 g/9000 m. Average dimensions and deniers of the warp and weft tapes can be the same or different, consistent with the parameters described above.

Another fabric construction comprises a plurality of substantially parallel warp tapes of a thermoplastic resin composition present at an average count of about 9 tapes per inch and a plurality of substantially parallel weft tapes comprising the thermoplastic resin present at an average count of about 9 per inch. Preferred tapes for such a construction have average widths of about 100 to about 126 mils. Preferred polypropylene tapes have average thicknesses of about 1.8 to about 2.6 mils and average deniers of about 1150 to about 1450 g/9000 m. Again, dimensions and deniers of the warp and weft tapes can be the same or they can be different consistent with the parameters described above.

A preferred fabric construction comprises a plurality of substantially parallel warp tapes of a thermoplastic resin composition present at an average count of about 10 tapes per inch and a plurality of substantially parallel weft tapes comprising the thermoplastic resin present at an average count of about 10 per inch. In such a construction preferred tapes have average widths of about 88 to about 113 mils. Preferred polypropylene tapes have average thicknesses of about 1.8 to about 2.6 mils and average deniers of about 1015 to about 1285 g/9000 m. Dimensions and deniers of the warp and weft tapes can be the same or they can be different within parameters described above.

Another preferred fabric construction comprises a plurality of substantially parallel warp tapes of a thermoplastic resin composition present at an average count of about 11 tapes per inch and a plurality of substantially parallel weft tapes comprising the thermoplastic resin present at an average count of about 11 per inch. Preferred tapes have average widths of about 80 to about 105 mils. Polypropylene tapes preferred for such a construction have average thicknesses of about 1.8 to about 2.6 mils and average deniers of about 950 to about 1175 g/9000 m. Average dimensions and average deniers of the warp tapes can be equal to those of the weft tapes or they can be different within the parameters described above.

Another preferred fabric construction comprises a plurality of substantially parallel warp tapes of a thermoplastic resin composition present at an average count of about 12 tapes per inch and a plurality of substantially parallel weft tapes comprising the thermoplastic resin composition at an average count of about 12 per inch. In such a construction the tapes preferably have average widths of about 75 to about 95 mils. Average thicknesses of about 1.8 to about 2.6 mils and average deniers of about 880 to about 1120 g/9000 m are preferred for polypropylene tapes. Warp and weft tapes in such a construction can have the same average dimensions and average deniers or they can be different within the parameters described above.

Another preferred fabric construction comprises a plurality of substantially parallel warp tapes of a thermoplastic resin composition present at an average count of about 13 tapes per inch and a plurality of substantially parallel weft tapes comprising the thermoplastic resin present at an average count of about 13 per inch. Preferred tapes have average widths of about 68 to about 88 mils. In such a construction, preferred polypropylene tapes have average thicknesses of about 1.8 to about 2.6 mils and average deniers of about 790 to about 1010 g/9000 m. Warp and weft tapes can have the same average deniers and dimensions or they can be different within the parameters described above.

Another preferred fabric construction comprises a plurality of substantially parallel warp tapes of a thermoplastic resin composition at an average count of about 14 tapes per inch and a plurality of substantially parallel weft tapes comprising the thermoplastic resin at an average count of about 14 per inch. Tapes preferably have average widths of about 64 to about 82 mils. Preferred polypropylene tapes have average thicknesses of about 1.8 to about 2.6 mils and average deniers of about 747 to about 952 g/9000 m. Average dimensions and average deniers of the warp tapes can be the same as average dimensions and deniers of the weft tapes or they can be different consistent with the parameters described above.

Preferred fabrics according to the invention are constructed of tapes composed of thermoplastic resin comprising polypropylene wherein tapes are stabilized within the fabric by a layer comprising a thermoplastic resin adhered to a plurality of the tapes at at least one surface of the fabric and the fabrics have dimensional stabilities such that a peak force of at least about 50 pounds is required to remove from the fabric ten adjacent parallel yarns disposed perpendicular to the direction in which the force is applied. These fabrics preferably have balanced constructions in which average warp and weft counts are the same or different by no more than about 15% and range from about 8 to about 14 tapes per inch, average warp and weft tape thicknesses are the same or different and range from about 1.8 to about 2.6 mils, average warp and weft tape thicknesses are the same or different and range from about 64 to about 132 mils, and a product of average warp count multiplied by average denier of the warp tapes and a product of average weft count multiplied by average denier of the weft tapes are the same or different and range from about 10,500 to about 13,000. More preferably, the products of average count multiplied by average denier are about 11,000 to about 12,500.

Balanced fabric constructions that are particularly preferred, especially for woven fabrics, are described in the following table in terms of average warp and weft counts (plus or minus 10%) of polypropylene warp and weft tapes of the stated widths, thicknesses and deniers (each plus or minus 10%) and products of average counts multiplied by average deniers.

| Ave. Counts (warp × weft) | Ave. Thicknesses (mils) | Ave. Widths (mils) | Ave. Deniers (g/9000 m) | Ave. Count × Ave. Denier |
|---|---|---|---|---|
| 8 × 8 | 2.2 | 125 | 1445 | 11560 |
| 9 × 9 | 2.2 | 113 | 1300 | 11700 |
| 10 × 10 | 2.2 | 100 | 1150 | 11500 |
| 11 × 11 | 2.2 | 92 | 1060 | 11660 |
| 12 × 12 | 2.2 | 85 | 1000 | 12000 |
| 13 × 13 | 2.2 | 78 | 900 | 11700 |
| 14 × 14 | 2.2 | 73 | 850 | 11900 |

Tapes for use in manufacture of the invented fabrics can be prepared by any suitable means. As noted above, extrusion of thermoplastic resin composition as a melt into tapes using suitably configured dies and extrusion of film and slitting the same into tapes are the most commonly employed methods utilized in the carpet backing industry and can be readily adapted to production of tapes having dimensions suited for the invented fabrics. In both the extrusion and slit film methods, tape thickness can be regulated by suitable selection of the width of the gap in the tape or film die. Manufacture of tapes with contoured surfaces is conveniently accomplished through use of tape or film extrusion dies with appropriate contours. In tape extrusion, tape widths are typically controlled by placement and spacing of inserts into the die gap. In slit film processes, spacing of the cutting means used to slit the film into tapes can be adjusted to provide desired tape widths. In tape extrusion, tapes are typically drawn or stretched after extrusion and quenching to increase tenacity. As is known, a result of this stretching is that the finished tapes are somewhat narrower and thinner than the undrawn tapes, and it is therefore important to take into account such changes in adjusting die dimensions to achieve the desired final tape dimensions. Like considerations also apply in slit film processes although adjustment of cutting means spacing will vary somewhat depending on whether stretching to increase tenacity is performed before or after slitting of the extruded, quenched film. These effects and suitable adjustments to account for changes in dimensions due to stretching or other drawing techniques are well known to persons skilled in the art of tape manufacture.

The fabrics are preferably woven fabrics because weaving contributes to dimensional stability. Most preferably the fabrics are woven in a plain weave to promote constructional balance in the warp and weft directions and to achieve an optimum combination of coverage and efficient usage of tapes. However, other weaves also can be used; an example is a twill weave. Weaving of fabrics from tapes is well known and typically conducted using a suitable loom which operates by insertion of weft tapes over and under alternating warp tapes with shifting thereof relative to one another to alternate the over and under disposition of tapes within the final fabric. A tufting lubricant, such as a functionalized medium-to-long chain fatty acid or lower alkyl ester thereof, a refined or synthetic polyglycol or ester thereof with a fatty acid or fatty triglyceride, a dibasic acid ester, a silicone or a silicone glycol, is usually applied to the warp or weft tapes or both prior to weaving to facilitate subsequent tufting operations. After weaving, the resulting woven fabrics are usually taken up from the loom on rolls or they can be stabilized and then fed to tufting without intermediate take-up if desired.

While woven fabrics are preferred because weaving itself contributes to dimensional stability, the invented fabrics can also comprise crosswise-disposed scrims of suitable configuration, cross-laid or loosely woven warp and weft tapes secured by stitching, lamination or heat bonding, or other suitable assemblages of warp and weft tapes with suitable balance in construction and adequate dimensional stability as formed or the capability to develop the same through further processing.

Tapes of the invented fabrics are stabilized within the fabrics to provide dimensional stabilities in both the warp and weft directions such that a peak force of at least about 50 pounds is required to remove from the fabric ten adjacent parallel yarns disposed perpendicular to the direction in which the force is applied. Lower dimensional stabilities are not suitable because the fabrics are prone to undesirable shifting or uneven advancement during tufting. Fabrics that are more preferred, especially for fine patterned tufting, require at least about 65 pounds peak force to remove ten yarns. Fabrics can be stabilized such that all or only some of the tapes making up the fabric are stabilized so long as the required dimensional stability is achieved. In a preferred embodiment of the invention, warp tapes and weft tapes are stabilized within the fabrics by a layer comprising a thermoplastic resin adhered to a plurality of tapes at at least one surface of the fabric. In another preferred embodiment, warp tapes and the weft tapes are stabilized within the fabric by adhesion of a plurality of warp tapes and weft tapes at their crossovers.

Stabilization of the fabrics can be accomplished by any means effective to yield fabrics having dimensional stabilities of at least about 50 pounds peak force for removal of ten yarns. Stabilization is preferably accomplished by extrusion coating of preformed fabric, by extrusion lamination of scrims or warp and weft tapes, or by heat bonding of warp and weft tapes in contact. Extrusion coating is the most preferred method for stabilizing the invented fabrics because it is a relatively simple and economical technique for achieving the desired levels of dimensional stability. Other suitable means for stabilizing the fabrics also can be employed, such as powder coating, adhesive bonding or stitching techniques; however, these tend to be more complicated and costly and are thus less preferred.

Extrusion coating is well known and typically comprises extruding a layer of molten thermoplastic resin onto a substrate fabric, applying pressure to the layer in contact with the substrate and cooling the melted resin to solidify the same. Coatings can be applied continuously or discontinuously, e.g., in stripes or other patterns, over the surface of the substrate provided that suitable dimensional stability is attained. The coatings can be applied to one or both surfaces of a fabric. Coatings are applied in thicknesses effective to provide adequate stabilization without rendering the coated fabrics so thick as to impede tufting, and preferably range from about ¾ to about 2 mils thick.

Suitable coating resins are thermoplastic resins capable of adhering to the tapes of the fabric. As an indicator of suitable adhesion, qualitative delamination testing can be performed by applying a strong, heavily adhesive tape, for example standard two inch wide duct tape, to a coated surface of a fabric and then removing it with a sharp pull and manually removing the coating at the edges of the uncoated area resulting from removal of the adhesive tape. If the coating at the edges comes off in sheet form, adhesion is generally not adequate; however, if the coating at the edges breaks off in relatively small pieces, then adhesion is generally adequate. When used to stabilize fabrics to be used as backings for carpet tiles, the coating resin should also have a softening point high enough to withstand heat exposures in carpet tile manufacture, and preferably greater than about 300° F. For tapes comprising polypropylene, preferred coating resins are propylene-dominated copolymers of propylene and ethylene and polypropylene-dominated blends of polypropylene and polyethylene. Such coating resins are also suitable for fabrics constructed from tapes of propylene-dominated propylene-ethylene copolymers. Other combinations of tape resins and coating resins can be determined by persons skilled in the coating and extrusion arts without undue experimentation.

For coating fabrics constructed of warp and weft tapes comprising polypropylene, a preferred coating method comprises extruding a blend of homopolymer polypropylene and low density polyethylene, in a weight ratio of about 2:1 to about 4:1 and having a melt flow rate of about 40–60 g/10 minutes according to ASTM D1238 at temperatures of about 500–550° F., through a die with a die gap of about 20 mils onto the fabric at or slightly upstream of a nip formed by a nip roll-chill roll pair maintained at about 90° F. Nip pressure is preferably about 65 psi. Line speeds of at least about 250 ft/min. are suitable; about 300–350 ft/min. is preferred.

While a preferred coating method is described above, it will be appreciated by persons skilled in the art that details of coating operations will vary with the choice of coating resin and substrate. Generally, coating resins should have melt viscosities suitable for film extrusion. Extrusion generally is conducted at temperatures about 100–200° F. above the softening point of the coating resin and pressures of 40–150 psi. Preferred conditions for particular choices of fabric and coating resin can be determined by persons skilled in the art without undue experimentation. Extrusion coating yields fabrics in which warp tapes and weft tapes are stabilized by a layer comprising a thermoplastic resin adhered to a plurality of tapes at at least one surface of the fabric. If desired, fabrics can be coated on both surfaces.

Stabilization of fabric also can be achieved by extrusion lamination. This involves extruding a laminating resin into or slightly upstream of a nip between rolls, each of which is carrying a substrate, and compressing the substrates and resin in the nip to laminate the substrates. As will be appreciated, this technique is best suited for manufacture of the invented fabrics from scrims or combinations of crosswise-disposed tapes which, when brought together via the lamination operation, form a fabric having the balanced construction described herein. Laminating resins should adhere strongly to tapes of the materials being laminated to ensure that the resulting structure has strength and integrity for tufting. A preferred laminating resin for polypropylene tapes is a polypropylene homopolymer or copolymer resin. Other combinations of tape resins and laminating resins can be determined without undue experimentation. Extrusion laminating conditions are generally as described above in regard to extrusion coating.

Another preferred technique for stabilizing the fabric comprises heat sealing the same so that warp and weft tapes are adhered at their contact areas or crossovers. This technique may offer advantages over the coating and laminating techniques described above because there is no need for extrusion of a coating or laminating resin. However, to adhere the tapes without loss of strength, it is preferred that at least some of the warp or weft tapes, or both, comprise two or more layers of different thermoplastic resins, one of which melts at a temperature suitable for heat sealing of the tapes and another of which melts at a higher temperature so that it will remain unsoftened and maintain strength and integrity after heat sealing. While an entire fabric can be constructed of such multi-layered, heat sealable tapes, it is also effective to utilize the same in combination with standard tapes in either or both of the warp and weft directions. For example, fabrics prepared from standard tapes but with every second or third weft tape being a multi-layered, heat sealable tape have adequate dimensional stabilities for the present invention.

Preferred tapes for use when stabilization is achieved by heat sealing comprise a three layered structure with a core layer of higher melting resin, e.g., polypropylene, sandwiched between two layers of lower melting thermoplastic resin composition, such as a propylene-ethylene copolymer or polypropylene-polyethylene blend, that provides good adhesion to the core and good adhesion to other tapes on heat sealing. Generally, the melting or softening points of the core and surface layer resins differ by at least about 10° F., and preferably by at least 20° F., so that heat sealing can be accomplished at a temperature sufficiently lower than that at which softening of the core layer resin and potential loss of strength or integrity occur. A particularly preferred multi-layered tape for this embodiment comprises a coextruded, three layered tape having a core of homopolymer polypropylene sandwiched between outer layers of propylene-ethylene copolymer wherein the core makes up about 70–90% of the thickness of the tape and each surface layer makes up about 5–15% of the thickness of the tape.

For heat sealing such fabrics, heating of the same at a temperature of about 270 to about 350° F. with application of pressures of about 150 to about 400 psi is effective to provide suitable adhesion of tapes and stabilization of the fabric. A suitable apparatus for performing the heat sealing is a roll pair system having at least one roll pair for heating and applying pressure to the fabric. As will be appreciated, specific conditions for particular fabrics will vary with composition of the tapes of which they are constructed and can be determined without undue experimentation.

It also will be appreciated that combinations of stabilization techniques can be employed if desired. For example, use of heat sealable tapes in conjunction with other stabilization techniques, for example extrusion coating or extrusion lamination, may enhance stability or reduce coating resin requirements or facilitate attainment of adequate stability with discontinuous coatings or improve coverage of a fabric as compared to stabilized fabrics prepared without coating or lamination.

The invented fabrics are particularly suited for use as backings or substrates in tufting operations wherein fibers or yarns are tufted into a backing or substrate, and particularly in manufacture of tufted carpets. Dimensional stability of the fabrics promotes even, regular tufting such that face fibers or yarns can be tufted in patterns without distortion. The balanced construction of the fabrics renders the same and other tufted products prepared from such fabrics resistant to curling on application of heat, such as is typically encountered in manufacture of carpet tiles or molding of automotive carpets to interior body surfaces.

Carpets comprising the invented fabrics as backings comprise the backings having a plurality of tufts of face yarns or fibers projecting outwardly from a surface of the backing and a plurality of stitches of the face yarns or fibers disposed on an opposing surface of the backing. Such carpets can be prepared by any suitable means. Commonly, the backing fabric is passed through a tufting device in which a plurality of needles reciprocate to stitch the face yarns into the fabric. In fabrics stabilized with a layer of thermoplastic resin adhered at a surface of the fabric, tufting into either the layer of thermoplastic resin or into the opposing surface of the fabric is suitable. Tufting with the fabrics disposed so that tufting needles first penetrate uncoated surfaces can facilitate tufting when the tapes of the fabrics are contoured. Face yarn tufts can be left uncut to form loop pile carpets or they can be cut to provide a cut pile. Preferably, the stitches are further secured to the opposing surface of the backing with an adhesive which is preferably a cured latex or thermoplastic resin. It also is preferred that the stitched surface of the fabric be adhered to a secondary backing with a suitable adhesive. The secondary backing imparts additional weight and dimensional stability to the carpets. Examples of suitable secondary backings include thermoplastic films and woven and nonwoven fabrics. Suitable adhesives can be the same as or different from those used to secure the face yarn stitches to the stitched surface of the invented fabrics used as backings; cured latexes and thermoplastic resins are preferred adhesives.

Carpet tiles comprise the invented fabrics tufted with face yarns or fibers as described above and adhered to a substantially self-supporting substrate. Common substrates include both rigid and resilient materials such as rubbers, thermoplastic elastomer formulations, vinyl plastisols and composites thereof with glass fiber mats or fabrics or other suitable materials.

The invention is described further in connection with the following examples, it being understood that the same are for purposes of illustration but not limitation.

In the examples, dimensional stability testing was performed on 4 inch by 6 inch rectangular samples of fabric using an Instron device and a pin bar with 5 pins about 0.2 inch high spaced about 0.25 inch apart. Samples were secured in clamps on the Instron device at one side and the pins of the pin bar were inserted into the samples between the 10th and 11th tapes from the opposing side of the samples. The pin bar was also secured to the Instron device. Force was applied in a direction perpendicular to the lengthwise direction of the yarns between which the pins were located. Crosshead speed of the Instron device was 12 inches/min. Peak force for pulling 10 yarns out of the sample is measured in pounds.

EXAMPLE 1

This example illustrates a fabric with a balanced construction of tapes comprising polypropylene with average warp and weft counts of about 12 tapes per inch, average warp and weft tape dimensions of about 2.2 mils thick by about 85 mils wide and average deniers of about 1000 g/9000 m. The fabric was stabilized by a 1 mil thick layer of thermoplastic resin adhered to tapes at a surface of the fabric.

Tapes were prepared by extruding about 97.8 parts by weight polypropylene homopolymer resin with a melt flow rate of 3–4 g/10 min., determined according to ASTM-D1238, and about 2.2 parts by weight heat-stabilized silver-gray pigment concentrate using a Davis Standard extruder operated at a melt pump rate of 25.7 rpm. The extruder barrel was heated in zones along its length at target temperatures of 500/475/465/450/450/450/450° F. Polypropylene melt was extruded through a slot in a 52 inch wide coathanger die maintained at 450° F. and having and a slot opening of about 20 mils through an air gap of 2 inches to an 85° F. quench water bath. The die had one lip contoured with a pattern of regularly spaced alternating ridges and grooves of equal heights and depths, respectively. After cooling in the quench bath, the film was slit into tapes using slitter blades spaced at about 200 mils. Tapes were fed to and withdrawn from an oven maintained at 260–270° F. using roll pairs operated at speeds to provide a draw ratio of 6.4:1. Tapes were annealed using a series of rolls heated at 335–350° F. The tapes had average thickness of about 2.2 mils, average width of about 85 mils and average denier of about 1000 g/9000 m.

The tapes were woven into fabric using a 220 inch projectile loom in a construction having average warp count of 12 tapes per inch and average weft count of about 12 tapes per inch. An ethylene-modified fatty acid, identified as Milliken's Tufting Finish from Milliken's Chemicals, was applied at a level of 2–3 wt. % to the warp tapes before tufting. The resulting fabric was extrusion coated over its full width with a propylene-ethylene copolymer having a melt flow rate of about 50 g/10 min. according to ASTM D1238 obtained from Rexene Corp. using an Egan extruder. The extruder was operated at a speed of 47 rpm, barrel zone temperatures of 425/450/475/500/525/550° F. and die temperature of 550° F. Die gap was about 20 mils. The coating resin was extruded through a gap of about 2 inches onto the fabric at the nip between two rolls maintained at 70° F. and nip pressure of 60–65 psi. Line speed was about 250 ft/min. The resulting coating was 1 mil thick.

Samples of the stabilized fabric were tested for curling by application of heat at 340–350° F. for 34 minutes. Most samples showed no edge curl although one curled about 2 mm and another curled about 4 mm. Samples of the stabilized fabric and of the fabric before extrusion coating were also tested for dimensional stability. Results are reported in Table 1 below.

Controls

Commercial woven polypropylene tape backing fabrics of various constructions were tested for dimensional stability. Constructions, tape dimensions (thickness ("t")×width ("w")), deniers and test results are reported in Table 1.

TABLE 1

| Sample | Ave. Counts (warp × weft) | Warp Tapes (t × w/denier) | Weft Tapes (t × w/denier) | Dimensional_Stability (lbs) |
| --- | --- | --- | --- | --- |
| A | 24 × 15 | 1.8 × 50/475 | 2.1 × 95/1050 | 10 |
| B | 22 × 24 | 1.8 × 50/475 | 2.1 × 55/600 | <30 |
| C | 28 × 15 | 1.5 × 43/387 | 2.1 × 95/1050 | — |
| Ex. 1 | 12 × 12 | 2.2 × 85/1000 | 2.2 × 85/1000 | 100 |
| Uncoated Ex. 1 | 12 × 12 | 2.2 × 85/1000 | 2.2 × 85/1000 | <10 |

A sample of Control Sample C was tested for curing as in Example 1. Edxge curl was 7–8 mm.

We claim:

1. Fabric suitable for tufting comprising a plurality of warp tapes and a plurality of waft tapes wherein average number of warp tapes per unit length and average number of weft tapes per unit length are the same or differ by not more than about 15%, average width of warp tapes and average width of weft tapes are the same or differ by not more than about 15%. average thickness and denier of warp tapes and average thickness and denier of weft tapes, respectively, are the same or differ by not more than about 15%; wherein a portion of the warp tapes or of the weft tapes or of both comprise polypropylene tapes that are not multi-layered and at least a portion of the warp tapes or of the weft tapes or of both are multi-layer tapes that comprise a first thermoplastic resin layer comprising a propylene-dominated propylene-ethylene copolymer or polypropylene-dominated blend of polypropylene and polyethylene and a second layer comprising a thermoplastic resin having a melting temperature higher than the melting temperature of the first thermoplastic resin layer and a plurality of tapes are heat sealed to the first thermoplastic resin layer at their crossovers with the multi-layer tapes to provide a level of dimensional stability such that a peak force of at least about 50 pounds is required to remove from the fabric ten adjacent parallel yarns disposed perpendicular to the direction in which the force is applied, and wherein such stabilization does not substantially impair tuftability of the fabric.

2. The fabric of claim 1 wherein average warp count is about 10 to about 14 tapes per inch and average weft count is about 10 to about 14 tapes per inch.

3. The fabric of claim 2, wherein the average warp count and average weft count differ by not more than about 10%.

4. The fabric of claim 2 wherein average denier of the warp tapes and average denier of the weft tapes differ by not more than about 10%.

5. The fabric of claim 1 wherein the warp tapes are polypropylene tapes that are not multi-layered and at least a portion of the weft tapes are multi-layer tapes.

6. The fabric of claim 1 wherein at least a portion of the warp tapes are multi-layer tapes.

7. The fabric of claim 6 wherein the multi-layer tapes comprise a core layer comprising polypropylene as the second thermoplastic resin layer and the core layer is sandwiched between two first thermoplastic resin outer layers comprising a propylene-dominated propylene-ethylene copolymer, and wherein the core layer makes up from about 70% to about 90% of the thickness of the multi-layer tapes and each outer layer makes up from about 5% to about 15% of the thickness of the multi-layer tapes.

8. The fabric of claim 1 wherein at least a portion of the weft tapes are multi-layer tapes.

9. The fabric of claim 8 wherein every second weft tape is a multi-layer tape.

10. The fabric of claim 8 wherein every third weft tape is a multi-layer tape.

11. The fabric of claim 8 wherein the multi-layer tapes comprise a core layer comprising polypropylene as the second thermoplastic resin layer and the core layer is sandwiched between two first thermoplastic resin outer layers comprising a propylene-dominated propylene-ethylene copolymer, and wherein the core layer makes up from about 70% to about 90% of the thickness of the multi-layer tapes and each outer layer makes up from about 5% to about 15% of the thickness of the multi-layer tapes.

12. The fabric of claim 11 wherein every second weft tape is a multi-layer tape.

13. The fabric of claim 11 wherein every third weft tape is a multi-layer tape.

14. Fabric suitable for tufting comprising a plurality of substantially parallel warp tapes and a plurality of substantially parallel weft tapes, wherein a portion of the warp tapes or of the weft tapes or of both comprise polypropylene tapes that are not multi-layered and at least a portion of the warp tapes or of the weft tapes or of both are multi-layer tapes that comprise a first thermoplastic resin layer comprising a propylene-dominated propylene-ethylene copolymer or polypropylene-dominated blend of polypropylene and polyethylene and a second layer comprising a thermoplastic resin having a melting temperature higher than the melting temperature of the first thermoplastic resin layer with warp tapes and weft tapes being stabilized within the fabric by adhesion of a plurality of tapes to the first thermoplastic resin layer at their crossovers with the multi-layer tapes to provide a level of dimensional stability such that a peak force of at least about 50 pounds is required to remove from the fabric ten adjacent parallel yarns disposed perpendicular to the direction in which the force is applied, but wherein such stabilization does not substantially impair tuftability of the fabric; and wherein (a) warp tapes and weft tapes are disposed so as to provide substantially full coverage without substantial overlap of warp tapes with other warp tapes and without substantial overlap of weft tapes with other weft tapes, (b) average count of warp tapes and average count of weft tapes are the same or different by no more than about 15% and range from about 8 to about 14 tapes per inch, (c) average thicknesses of warp tapes and average thicknesses of weft tapes are the same or different by no more than about 15% and range from about 1.8 to about 2.6 mils, and (d) average deniers of warp tapes and average deniers of weft tapes are the same or different by no more than about 15% and range from about 650 to about 1750.

15. The fabric of claim 14 wherein at least a portion of the warp tapes are multi-layer tapes.

16. The fabric of claim 15 wherein the multi-layer tapes comprise a core layer comprising polypropylene as the second thermoplastic resin layer and the core layer is sandwiched between two first thermoplastic resin outer layers comprising a propylene-dominated propylene-ethylene copolymer, and wherein the core layer makes up from about 70% to about 90% of the thickness of the multi-layer tapes and each outer layer makes up from about 5% to about 15% of the thickness of the multi-layer tapes.

17. The fabric of claim 14 wherein at least a portion of the weft tapes are multi-layer tapes.

18. The fabric of claim 17 wherein the multi-layer tapes comprise a core layer comprising polypropylene as the second thermoplastic resin layer and the core layer is sandwiched between two first thermoplastic resin outer layers comprising a propylene-dominated propylene-ethylene copolymer, and wherein the core layer makes up from about 70% to about 90% of the thickness of the multi-layer tapes and each outer layer makes up from about 5% to about 15% of the thickness of the multi-layer tapes.

* * * * *